United States Patent
Asada et al.

(10) Patent No.: US 11,262,329 B2
(45) Date of Patent: Mar. 1, 2022

(54) METHOD OF TESTING CORROSION RESISTANCE OF COATED METAL MATERIAL

(71) Applicant: MAZDA MOTOR CORPORATION, Hiroshima (JP)

(72) Inventors: Teruaki Asada, Hiroshima (JP); Tsutomu Shigenaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 184 days.

(21) Appl. No.: 16/699,848

(22) Filed: Dec. 2, 2019

(65) Prior Publication Data
US 2020/0182824 A1    Jun. 11, 2020

(30) Foreign Application Priority Data
Dec. 11, 2018    (JP) .............................. JP2018-231983

(51) Int. Cl.
*G01N 17/02*     (2006.01)
*G01N 27/413*    (2006.01)

(52) U.S. Cl.
CPC ........... *G01N 27/413* (2013.01); *G01N 17/02* (2013.01)

(58) Field of Classification Search
CPC .................................................. G01N 17/02
See application file for complete search history.

(56) References Cited

U.S. PATENT DOCUMENTS 3,293,155 A    12/1966    Stone

FOREIGN PATENT DOCUMENTS

| EP | 3 660 488 A1 | 6/2020 |
|----|---|---|
| JP | 2007271501 A | 10/2007 |
| JP | 2011033596 A | 2/2011 |
| JP | 2016050915 A | 4/2016 |
| JP | 2016050916 A | 4/2016 |

OTHER PUBLICATIONS

Walter Schulte, "The Influence of Cinders on the Corrosion of Iron Imbedded in Clay," The Journal of Industrial and Engineering Chemistry Jul. 1913, pp. 554-557 (Year: 1913).*

Sjogren L et al.; "Corrosion resistance of stainless steel pipes in soil", Materials and Corrosion, Wiley, vol. 62, No. 4, dated Apr. 1, 2011, pp. 299-309, XP001561849.

* cited by examiner

*Primary Examiner* — Alexander S Noguerola
(74) *Attorney, Agent, or Firm* — Studebaker & Brackett PC

(57) ABSTRACT

Disclosed herein is a method of testing a corrosion resistance of a coated metal material including a surface treatment film on a metal substrate. The method includes: treatment of interposing a water-containing electrolyte material containing water, a supporting electrolyte, and a water penetration enhancer, between a surface of the surface treatment film of the coated metal material and an electrode; holding of the water-containing electrolyte material on the surface of the surface treatment film for one minute to one day; and electrical conduction from the electrode through the water-containing electrolyte material to the coated metal material.

11 Claims, 8 Drawing Sheets

FIG.4

| DEPOSITS ON COATS | EXPOSURE ATMOSPHERE | ELECTRO-DEPOSITION BAKING CONDITIONS | THICKNESS OF ELECTRO-DEPOSITION COAT (μm) | WATER ABSORPTION μ mm⁻³ (AFTER 9 DAYS) | SWELLING RATE (%) (AFTER 9 DAYS) | APPEARANCE (AFTER 9 DAYS) |
|---|---|---|---|---|---|---|
| WATER | 50°C, 98% | 150°C × 20 min | 10 | 18.9 | 0.1 | |
| 5% OF NaCl (SPRAY) | | | | 29.8 | 0.7 | |
| 5% OF CaCl₂ (SPRAY) | | | | 22.6 | 0.4 | |

FIG.5

| DEPOSITS ON COATS | EXPOSURE ATMOSPHERE | ELECTRO-DEPOSITION BAKING CONDITIONS | THICKNESS OF ELECTRO-DEPOSITION COAT (μm) | WATER ABSORPTION μ mm$^{-3}$ (AFTER 9 DAYS) | SWELLING RATE (%) (AFTER 9 DAYS) | APPEARANCE (AFTER 9 DAYS) |
|---|---|---|---|---|---|---|
| SIMULATED MUD | 50°C, 98% | 140°C × 15 min | | 1150.2 | 40 | |
| | | 140°C × 20 min | 10 | 1372.9 | 50 | |
| | | 150°C × 20 min | | 248.8 | 5.8 | |
| | | | 15 | 63.2 | 4.8 | |

FIG.6

| DEPOSITS ON COATS | EXPOSURE ATMOS-PHERE | ELECTRO-DEPOSITION BAKING CONDITIONS | THICKNESS OF ELECTRO-DEPOSITION COAT ($\mu m$) | WATER ABSORPTION $\mu\,mm^{-3}$ (AFTER 9 DAYS) | SWELLING RATE (%) (AFTER 9 DAYS) | APPEARANCE (AFTER 9 DAYS) |
|---|---|---|---|---|---|---|
| 5% OF NaCl (IMMER-SION) | 50°C | 140°C × 15 min | | 223.5 | 13.5 | |
| | | 140°C × 20 min | 10 | 81.4 | 7.3 | |
| | | | | 47.7 | 3.5 | |
| | | 150°C × 20 min | 15 | 27.5 | 3 | |

METHOD OF TESTING CORROSION RESISTANCE OF COATED METAL MATERIAL

CROSS-REFERENCE TO RELATED APPLICATION

This application claims priority to Japanese Patent Application No. 2018-231983 filed on Dec. 11, 2018, the entire disclosure of which is incorporated by reference herein.

BACKGROUND

The present disclosure relates to a method of testing the corrosion resistance of a coated metal material.

Accelerated corrosion tests such as combined cyclic corrosion tests have been performed as methods of evaluating the performance of coats.

Such an accelerated corrosion test requires several months for evaluation. It is thus difficult to simply evaluate, for example, the qualities of coats to be coated on steel sheets made of different constituent materials under different baking conditions and to rapidly provide optimum coating conditions. Establishment of a quantitative evaluation method of rapidly and simply evaluating the corrosion resistance of a coated steel sheet is thus desired in the field of quality management related to material development, process management in a coating factory, and vehicle rust prevention.

By contrast, Japanese Unexamined Patent Publication No. 2007-271501 discloses evaluating the anticorrosion performance of a coat as a method of evaluating the corrosion resistance of the coat on a surface of a metal member. In the method, the metal member and a counter electrode member are immersed into water or an electrolyte. The negative terminal of a measuring power supply is electrically connected to the metal member, whereas the positive terminal is electrically connected to the counter electrode member. The anticorrosion properties are evaluated based on an oxygen diffusion-limited current flowing from the counter electrode member through the coat to the metal member.

Japanese Unexamined Patent Publication No. 2016-50915 discloses evaluating the corrosion resistance of a coated metal material as follows. An electrode is disposed on the surface of the coated metal material provided with a coat with an electrolyte material interposed therebetween. A voltage is applied between the substrate of the coated metal material and the surface with the coat. The corrosion resistance is evaluated based on the voltage at breakdown of the coating film.

Japanese Unexamined Patent Publication No. 2016-50916 discloses evaluating the corrosion resistance of a coated metal material as follows. An electrode is disposed on the surface of the coated metal material provided with a coat with an electrolyte material interposed therebetween. The electrolyte material penetrates into the coat of the coated metal material. A voltage is applied between the substrate of the coated metal material and the surface with the coat is evaluated based on a value related to a current flowing upon application of the voltage.

SUMMARY

In the method of testing the corrosion resistance disclosed in each of Japanese Unexamined Patent Publication No. 2007-271501, Japanese Unexamined Patent Publication No. 2016-50915, and Japanese Unexamined Patent Publication No. 2016-50916, the electrode is disposed on the surface of the coated metal material. Electricity is conducted from the electrode through the electrolyte material and the surface treatment film to the metal substrate. The electrical conduction causes migration of ions and penetration of water from the electrolyte material to the surface treatment film. In this case, the ions and water penetrating into the surface treatment film are involved in the electrical conduction to the metal substrate. Rapid and uniform migration of ions and penetration of water into the surface treatment film are thus desirable to improve the reliability of the corrosion resistance test and to reduce the test time.

It is an objective of the present disclosure to provide a method of testing corrosion resistance that enables rapid and uniform migration of ions and penetration of water into a surface treatment film to improve the reliability of the corrosion resistance test and reduce the test time.

In order to achieve the objective, disclosed herein is a method of testing corrosion resistance of a coated metal material including a surface treatment film on a metal substrate. The method includes: treatment of interposing a water-containing electrolyte material containing water, a supporting electrolyte, and a water penetration enhancer, between a surface of the surface treatment film of the coated metal material and an electrode; holding of the water-containing electrolyte material on the surface of the surface treatment film for one minute to one day; and electrical conduction from the electrode through the water-containing electrolyte material to the coated metal material.

In the holding, the coated metal material and/or the water-containing electrolyte material has/have a temperature ranging from 30° C. to 100° C. in one preferred embodiment.

In this method, the water-containing electrolyte material contains the water penetration enhancer and the holding proceeds before the electrical conduction. This promotes migration of ions and penetration of water into the surface treatment film in advance. Accordingly, the test time decreases and the reliability of the corrosion resistance test improves.

The water penetration enhancer is desirably made of clay minerals. The water-containing electrolyte material is desirably mud. The clay minerals promote migration of ions and penetration of water into the surface treatment film and thus effectively promotes the progress of corrosion. Being mud, the water-containing electrolyte material can be provided even on a non-horizontal surface of the surface treatment film. The clay minerals are layered silicate minerals or zeolite in one preferred embodiment. The layered silicate minerals are at least one selected from kaolinite, montmorillonite, sericite, illite, glauconite, chlorite, and talc in one preferred embodiment.

The supporting electrolyte is at least one kind of salt selected from sodium chloride, sodium sulfate, and calcium chloride in one preferred embodiment.

In one embodiment, the method may further include: introduction of artificial defects into two distant points of the coated metal material, the artificial defects penetrating the surface treatment film to reach the metal surface. In the treatment, the artificial defects at the two points may be electrically connected by an external circuit with the water-containing material interposed between the surface of the surface treatment film and the electrode. In the electrical conduction, the electricity may be conducted by the external circuit to the metal substrate to promote corrosion of the coated metal material with one of the artificial defects at the two points serving as an anode site and the other as a cathode site.

It is known that corrosion of metal proceeds when an anode reaction (oxidization reaction) and a cathode reaction (reduction reaction) occur at the same time. At the anode reaction, metal in contact with water is dissolved (ionized) to generate free electrons. At the cathode reaction, the free electrons cause the oxygen dissolved in the water to generate a hydroxyl group $OH^-$.

According to the present technique, the one of the artificial defects at the two points of the coated metal material serves as the anode site causing an elution reaction (oxidation reaction) of the metal of the metal substrate. The other artificial defect, into which the electrons generated at the anode site flow through the metal substrate, serves as the cathode site at which the electrons causes the reduction reaction.

At the anode site, the eluted metal ions are attracted to the electrode (negative electrode) and reacts with the oxygen dissolved in the water-containing electrolyte material or the $OH^-$ generated by electrolysis of water at the electrode (negative electrode) to be iron hydroxide. At the anode site supplied with the electrons, the metal of the metal substrate is as ions slightly dissolved in the water-containing electrolyte material in the same principle as electrolytic protection. The corrosion of the coated metal material does not progress.

By contrast, at the cathode site, the electrons flowing from the anode site through the metal substrate reacts with the water penetrating into the surface treatment film, the dissolved oxygen, or ionized $H^+$ in the water, thereby generating hydrogen or $OH^-$. Hydrogen is also generated by the electrolysis of water. This increases pH under the surface treatment film and progresses the corrosion of the coated metal material.

The generation of $OH^-$ at the cathode site corresponds to the cathode reaction of the corrosion model described above. It can be thus said that the method described above causes the external circuit to conduct electricity to the metal substrate to accelerate and reproduce the actual corrosion of the coated metal material.

At the cathode site of the artificial defects at the two points, alkalization (generation of $OH^-$) negatively affects substrate treatment (conversion coating) of the metal substrate surface and degrades the adhesion of the surface treatment film (simply degrades the adhesion between the metal substrate and the surface treatment film, if no substrate treatment is performed), thereby swelling the surface treatment film. Hydrogen gas generated by the electrolysis of water or the reduction of $H^+$ promotes the swelling of the surface treatment film. Therefore, the rate of corrosion progress of a material under test (MUT) can be measured in a corrosion resistance test by checking the degree of the swelling of the surface treatment film.

In this manner, the corrosion resistance test accelerates and reproduces the actual corrosion, thereby increasing the correlation between the obtained data on the rate of corrosion progress and the actual rate of corrosion progress. Accordingly, the corrosion resistance of the MUT can be highly reliably evaluated based on the data on the corrosion progress rate data.

The one of the artificial defects at the cathode site desirably has a size ranging from 0.1 mm to 5 mm.

With respect to the size of the artificial defect at the cathode site (the size of the exposed part of the metal substrate), the smaller the size, the lower the electrical conductivity becomes and the less the cathode reaction progresses. On the other hand, the larger the size, the more unstable the cathode reaction becomes and the less the acceleration and reproducibility of the corrosion become. Setting the size of the artificial defect to fall within the range described above achieves both the promotion of the cathode reaction and the acceleration and reproduction of the corrosion.

The electricity is conducted by setting a current value within a range from 10 μA to 10 mA in one preferred embodiment.

With respect to the conducted current value, the smaller the current value, the less the corrosion is accelerated, thereby requiring a longer time for a test. On the other hand, the larger the current value, the more unstable the cathode reaction rate becomes and the less the correlation with the actual progress of the corrosion becomes. Setting the current value within the range described above achieves both a reduction in the test time and an improvement in the reliability of the test.

Suitable examples of the coated metal material used for the corrosion resistance test may include a coated metal material including a resin coat as the surface treatment film on a metal substrate.

The metal substrate may be, for example, a steel material constituting an electric household appliance, a building material, or an automobile part, a cold rolled steel sheet (SPCC), an alloyed hot-dip galvanized steel sheet (GA), a high-tensile strength steel sheet or a hot stamping material, or a light alloy material. The metal substrate may include, on its surface, a conversion film (e.g., a phosphate film, such as a zinc phosphate film, or a chromate film).

The resin coat may be, for example, a laminated coating film including an epoxy or acrylic resin-based cationic electrodeposition coat (primer coat). The laminated coating film may be obtained through depositing a finish coat on the electrodeposition coat or depositing an intermediate coat and a finish coat on the electrodeposition coat.

The electrode may be buried in the water-containing electrolyte material to conduct electricity to the metal substrate. The electrode may be a platinum or carbon electrode, for example. Alternatively, a perforated electrode with at least one through-hole opposed to the surface treatment film may be used, which is disposed substantially in parallel to the surface treatment film in one preferred embodiment. For example, the perforated electrode is in a ring shape with, at its center, a through-hole opposed to one of the artificial defects. Alternatively, the perforated electrode may be a mesh electrode substantially in parallel to the surface treatment film with the mesh electrode buried in the water-containing electrolyte material.

In the present disclosure, the holding precedes the electrical conduction and the water-containing electrolyte material contains the water penetration enhancer. This promotes migration of ions and penetration of water into the surface treatment film in advance. Accordingly, the test time decreases and the reliability of the corrosion resistance test improves.

BRIEF DESCRIPTION OF THE DRAWINGS

FIG. 4 is a table illustrating the water absorption and swelling rates of coats on which water, a spray of 5% of NaCl, and a spray of 5% of CaCl$_2$) are deposited.

FIG. 5 is a table illustrating the water absorption and swelling rate of a coat on which simulated mud is deposited.

FIG. 6 is a table illustrating the water absorption and swelling rate of a coat on which 5% of NaCl (immersion) is deposited.

DETAILED DESCRIPTION

Embodiments of the present disclosure will now be described with reference to the drawings. The following preferred description of the embodiments is merely an example in nature, and is not intended to limit the scope, applications, or use of the present disclosure.

First Embodiment

Figure 1:
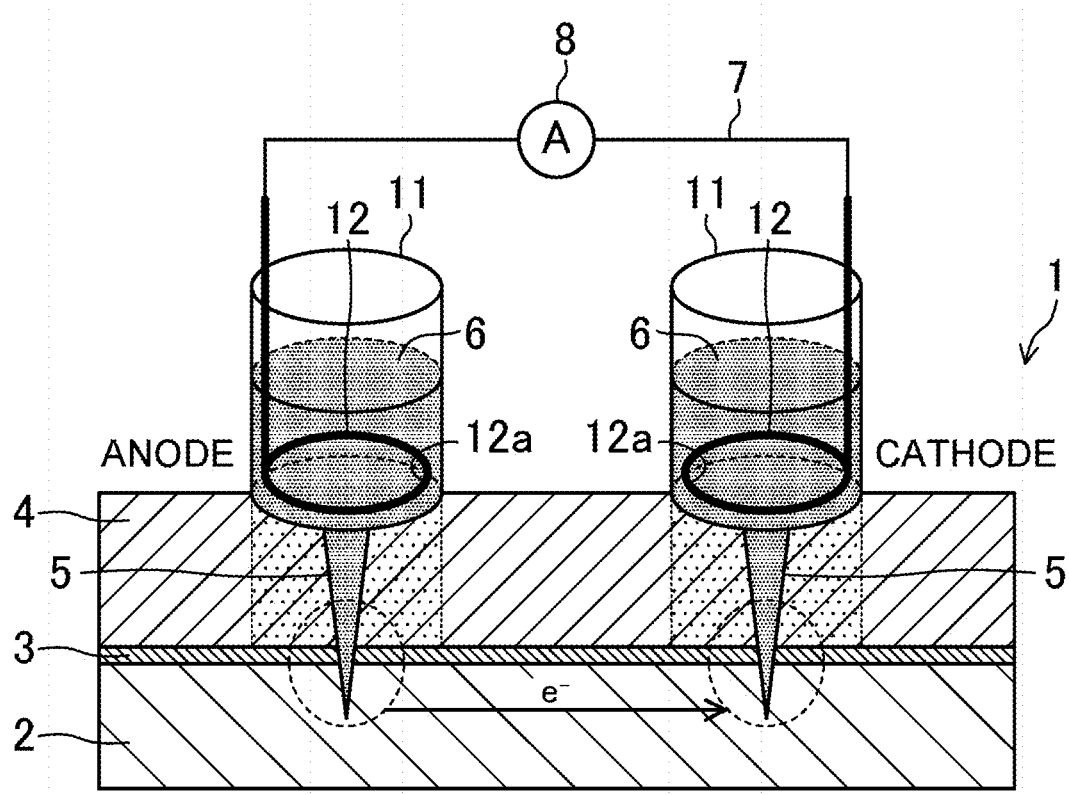
FIG. 1 illustrates the principle of a corrosion resistance test according to a first embodiment.

FIG. 1 illustrates the principle of a corrosion resistance test. In the figure, reference numeral 1 denotes a coated metal material. The coated metal material 1 according to this embodiment includes a resin coat (i.e., an electrodeposition coat 4 in this embodiment) as a surface treatment film on a steel sheet 2 as a metal substrate. The steel sheet 2 has, on its surface, a conversion film 3.

The coated metal material 1 has at two distant points, artificial defects 5 penetrating the electrodeposition coat 4 and the conversion film 3 to reach the steel sheet 2.

The method of testing corrosion resistance according to this embodiment may be implemented by a corrosion resistance tester shown in FIG. 1, for example. Specifically, the corrosion resistance tester includes an external circuit 7 and a conduction means 8. The external circuit 7 electrically connects the artificial defects 5 at the above-mentioned two points of the coated metal material 1 through a water-containing material (water-containing electrolyte material) 6 that functions as a conductive material. The conduction means 8 is a constant direct current supply conducting electricity through the external circuit 7 to the steel sheet 2.

At the two points of the coated metal material 1, cylinders 11 with a larger size than the artificial defects 5 are arranged concentrically with the artificial defects 5. The water-containing material 6 is contained in the cylinders 11 in contact with the surface of the electrodeposition coat 4 and enters the inside of the artificial defects 5. Electrodes 12 are arranged on both ends of the external circuit 7 and buried in the water-containing material 6 inside the cylinders 11.

The water-containing material 6 is mud containing water, a supporting electrolyte, and clay minerals as a water penetration enhancer.

The supporting electrolyte (salt) may be at least one kind of salt selected from sodium chloride, sodium sulfate, calcium chloride, calcium phosphate, potassium chloride, potassium nitrate, potassium hydrogen tartrate, and magnesium sulfate, for example. Out of these, at least one kind of salt selected from sodium chloride, sodium sulfate, and calcium chloride may be used in one particularly preferred embodiment. The water-containing electrolyte material may contain the supporting electrolyte at a concentration ranging preferably from 1 mass % to 20 mass %, more preferably from 3 mass % to 15 mass %, and particularly preferably from 5 mass % to 10 mass %.

The clay minerals are for making the water-containing material 6 into mud and promoting the migration of ions and penetration of water into the electrodeposition coat 4 to promote corrosion. The clay minerals may be layered silicate minerals or zeolite, for example. The layered silicate minerals may be at least one selected from kaolinite, montmorillonite, sericite, illite, glauconite, chlorite, and talc, for example. Out of these, kaolinite may be used in one particularly preferred embodiment. The water-containing electrolyte material may contain the clay minerals at a concentration ranging preferably from 1 mass % to 70 mass %, more preferably from 10 mass % to 50 mass %, and particularly preferably from 20 mass % to 30 mass %. Being mud, the water-containing material 6 can be provided even on a non-horizontal surface of the electrodeposition coat 4.

The water-containing material 6 may contain additives in addition to water, the supporting electrolyte, and the clay minerals. Specific examples of the additives may include organic solvents such as acetone, ethanol, toluene, and methanol. If the water-containing material 6 contains an organic solvent, the content of the organic solvent preferably ranges from 5% to 60% of water in terms of volume ratio. The volume more preferably ranges from 10% to 40%, and still more preferably ranges from 20% to 30%.

Each of the electrodes 12 is a ring-shaped perforated electrode with a through-hole 12a at its center and disposed in parallel to the electrodeposition coat 4 so that the through-hole 12a is opposed to and concentric with the corresponding one of the artificial defects 5.

The hydrogen gas generated at the artificial defects 5 goes out through the through-holes 12a of the electrodes 12. This prevents or reduces retention of the hydrogen gas between the electrodes 12 and the electrodeposition coat 4, that is, prevents or reduces deterioration of the conductivity.

The conduction means 8 may be, for example, a galvanostat. The current value is controlled within a range, preferably from 10 µA to 10 mA, more preferably from 100 µA to 5 mA, and particularly preferably from 500 µA to 2 mA.

Method of Testing Corrosion Resistance

A method of testing the corrosion resistance of the coated metal material 1 using the corrosion resistance tester will be described in order of steps.

Introduction of Artificial Defects

The artificial defects 5 that penetrate the electrodeposition coat 4 and the conversion film 3 to reach the steel sheet 2 are introduced into two distant points of the coated metal material 1.

In general, a coated metal material with a coat starts to corrode after a corrosion factor such as salt water has penetrated into the coat and reached the substrate. The process of corrosion of the coated metal material is divided into a stage in which the corrosion occurs and a stage in which the corrosion progresses. Evaluation can be made by obtaining the period until the corrosion starts (i.e., a non-corrosion period) and the rate at which the corrosion progresses (rate of corrosion progress).

Upon introduction of the artificial defects 5 that penetrate the electrodeposition coat 4 and the conversion film 3 to reach the steel sheet 2, the points with the artificial defects 5 start to corrode. The introduction of the artificial defects 5 simulatively creates, out of the process of corrosion of the coated metal material, the end of the stage after which the corrosion occurs, that is, the end of the non-corrosion period.

The artificial defects 5 expose the parts of the steel sheet 2 with a size ranging preferably from 0.1 mm to 5 mm (i.e., the areas of the exposed surfaces may range from 0.01 mm$^2$ to 25 mm$^2$), more preferably from 0.3 mm to 2.0 mm, and particularly preferably from 0.5 mm to 1.5 mm. The artificial defects 5 may be introduced with any type of tool. For example, a Vickers hardness tester may be used in one preferred embodiment to allow its indenter to damage the coated metal material at a predetermined load in order to prevent variations in the sizes and depths of the artificial defects 5, that is, quantitatively damage the coated metal material. The distance between the artificial defects 5 at the two points may be preferably 2 cm or more and more preferably 3 cm or more in view of easily checking the swelling of the electrodeposition coat 4 at the cathode site.

Treatment

The cylinders 11 surrounding the respective artificial defects 5 at the two points are put on the electrodeposition coat 4 of the coated metal material 1. A predetermined amount of the muddy water-containing material 6 is introduced into the cylinders 11. At this time, the ring-shaped electrodes 12 of the external circuit 7 including the conduction means 8 are buried in the water-containing material 6. The cylinders 11 may be concentric with the artificial defects 5 in one preferred embodiment. The electrodes 12 may also be concentric with the artificial defects 5 to be parallel to the surface of the electrodeposition coat 4 in one preferred embodiment.

As a result, the water-containing material 6 contained in the cylinders 11 is in contact with the surface of the electrodeposition coat 4 and penetrates into the artificial defects 5. The artificial defects 5 at the two points are then electrically connected by the external circuit 7 through the water-containing material 6 that is in contact with the artificial defects 5.

Holding

The water-containing material 6 is located on the surface of the electrodeposition coat 4. This state is held for a period preferably from one minute to one day, more preferably from 10 minutes to 120 minutes, and particularly preferably from 15 minutes to 60 minutes. This allows the water-containing material 6 to penetrate into the electrodeposition coat 4.

The method of testing corrosion resistance according to this embodiment includes the holding before next electrical conduction. This promotes, in advance, the migration of ions and penetration of water into the electrodeposition coat 4 after the end of the non-corrosion period. In particular, as indicated by dots in FIG. 1, this promotes the migration of ions and penetration of water into the regions of the electrodeposition coat 4 around the artificial defects 5 after the end of the non-corrosion period. Accordingly, the corrosion of the conversion film 3 and the steel sheet 2 smoothly progresses in the next electrical conduction. This also promotes the swelling of the electrodeposition coat 4 for evaluating the rate of corrosion progress representing the progress of corrosion, thereby reducing the test time. In addition, the electricity is conducted after the end of the so-called non-corrosion period, which allows accurate measurement of the rate of corrosion progress, thereby improving the reliability of the corrosion resistance test.

In view of further promoting the migration of ions and penetration of water into the electrodeposition coat 4, the coated metal material 1 and/or the water-containing material 6 may be set to a temperature ranging, preferably from 30° C. to 100° C., more preferably from 50° C. to 100° C., and particularly preferably from 50° C. to 80° C. Specifically, the temperatures of the coated metal material 1 and the water-containing material 6 may be increased and adjusted by disposing, for example, a hot plate under the coated metal material 1 or winding, for example, rubber heaters and film heaters around the cylinders 11 in FIG. 1. Alternatively, the temperature of only one of the coated metal material 1 and the water-containing material 6 may be increased and adjusted. The temperature of the device as a whole may be increased and adjusted.

Electrical Conduction

The conduction means 8 is operated to allow the external circuit 7 to conduct electricity to the steel sheet 2 of the coated metal material 1 through the electrodes 12, the water-containing material 6, and the electrodeposition coat 4. The conduction may be controlled at a constant current value within the range described above in one preferred embodiment.

The conduction allows electrons e$^-$ to flow from the water-containing material 6 to the steel sheet 2 at one (the left in FIG. 1) of the artificial defects 5 at the two points connected to the negative electrode of the conduction means 8. The one of the artificial defects 5 serves as the anode site. The e$^-$ flowed into the steel sheet 2 passes through the steel sheet 2 to migrate to the other artificial defect 5 (the right in FIG. 1) and goes out of the other artificial defect 5 to the water-containing material 6. The other artificial defect 5 serves as the cathode site.

At the anode site supplied with e$^-$, Fe of the steel sheet 2 is dissolved as ions in the water-containing material 6 (Fe→Fe$^{2+}$+2e$^-$) in the same principle as electrolytic protection. However, the corrosion of the coated metal material 1 does not progress.

By contrast, at the cathode site to which the electrons migrate from the anode site, OH$^-$ is generated by the reaction among the water of the water-containing material 6, dissolved oxygen, and the electrons e$^-$ (H$_2$O+½O$^2$+2e$^-$→2OH$^-$).

In addition, hydrogen is generated by the reaction between the ionized hydrogen ions of the water-containing material 6 and the electrons e$^-$ (2H$^+$+2e$^-$→H$_2$). OH$^-$ and hydrogen are generated by the cathode reaction (reduction reaction). Hydrogen is also generated by electrolysis of water.

At the cathode site, alkalization (generation of OH$^-$) dissolves the conversion film 3, and the progress of the corrosion of the steel sheet 2 (generation of hydrated iron oxide) reduces the adhesion of the electrodeposition coat 4 with the steel sheet 2. The generation of the hydrogen gas swells the electrodeposition coat 4 so that the corrosion of the steel sheet 2 spreads from the point of the artificial defect 5 to the vicinity.

Figures 2, 3:
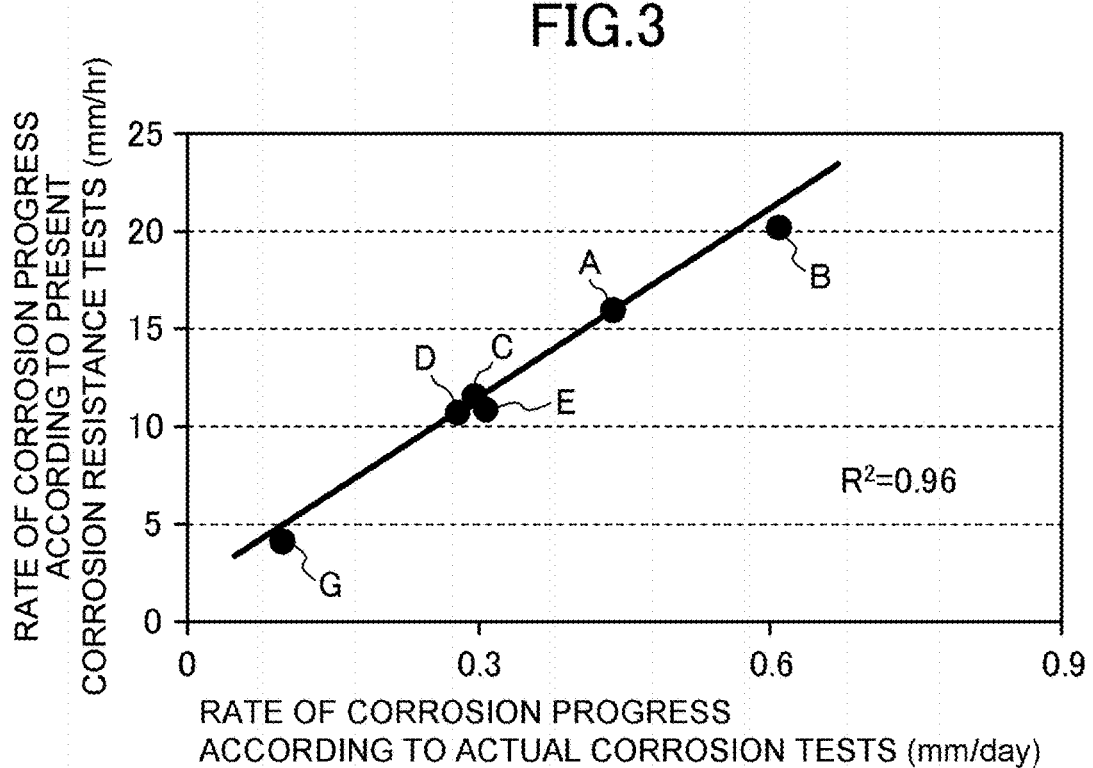
FIG. 2 is a table illustrating corrosion resistance test results of a material under test (MUT) 1 in Comparative Example 3.
FIG. 3 is a graph illustrating the correlation between the rates of corrosion progress in Example 1 and Test Example 1.

Specifically, FIG. 2 provides appearance photographs of the anode and cathode sites of a material under test (MUT) 1 of Comparative Example 3 in a corrosion resistance test described later. The "appearance photograph (before removal)" is the photograph of the surface of the coated metal material 1 after the test. The "appearance photograph (after removal)" is the photograph of the surface of the coated metal material 1 from which a swelling part of the electrodeposition coat 4 is removed with an adhesive tape. At the anode site, the formation of the artificial defect 5 but no swelling of the electrodeposition coat 4 can be observed. On the other hand, at the cathode site, the artificial defect 5 and the swelling part of the electrodeposition coat 4 around the artificial defect 5 are observed.

In electrical conduction of the external circuit 7, cations (e.g., $Na^+$) in the water-containing material 6 migrate toward the steel sheet 2 through the electrodeposition coat 4, upon application of a voltage to the water-containing material 6 at the cathode. Drawn by these cations, water penetrates into the electrodeposition coat 4. At the anode site as well, anions (e.g., $Cl^-$) in the water-containing material 6 migrate toward the steel sheet 2 through the electrodeposition coat 4. Drawn by these anions, water penetrates into the electrodeposition coat 4.

In particular, in this embodiment, the electrodes 12 surround the respective artificial defects 5. A voltage is thus stably applied to the electrodeposition coat 4 around the artificial defects 5. This leads to efficient migration of ions and efficient penetration of water into the electrodeposition coat 4 at the time of electrical conduction. In addition, at the cathode site, the hydrogen gas is generated at the artificial defect 5 as described above. The hydrogen gas goes out through the through-hole 12a of the electrode 12, which hinders deterioration in the electrical conductivity.

Since the water-containing material 6 is mud containing clay minerals, ions and water easily penetrate into the parts of the electrodeposition coat 4 around the artificial defects 5.

In this manner, in addition to the holding, the electrical conduction promotes the penetration of the ions and water into the parts of the electrodeposition coat 4 around the artificial defects 5 at the anode and cathode sites. Accordingly, the flow of electricity is rapidly stabilized. As a result, the corrosion stably spreads from the artificial defect 5 at the cathode site to the vicinity.

The electrical conduction may be performed for, for example, 0.5 hours to 24 hours in view of sufficiently spreading the swelling of the coat. The electrical conduction time may be preferably from one hour to ten hours, and more preferably from one hour to five hours.

Evaluation of Corrosion Resistance

As described above, the progress of corrosion at the cathode site appears as the development of the swelling of the electrodeposition coat 4, that is, the spread of the swelling of the coat. By observing how much the swelling of the coat spreads when the predetermined time has passed from the start of the electrical conduction, the corrosion resistances, particularly, the rates of corrosion progress of the MUTs can be evaluated.

How much the swelling of the coat spreads can be figured out as follows. After the corrosion resistance tests, the adhesive tape is adhered to the electrodeposition coat 4 to remove the swelling part of the electrodeposition coat 4. The size (hereinafter referred to as "size of removal") of the exposed surface of the steel sheet 2 is measured.

The corrosion resistances of the MUTs may be evaluated in association with the actual corrosion tests as follows. The relationship between the rates of corrosion progress (an increase in the size of the swelling part of the coat per unit time) according to the present corrosion tests and the actual corrosion tests are obtained in advance. The degrees of corrosion resistances can be obtained based on the results of the present corrosion resistance tests in correspondence to the actual corrosion tests.

Example

Corrosion Resistance Test

Seven types of MUTs (coated metal materials) shown in Table 1 were prepared, among which the coating conditions, that is, chemical treatment times using zinc phosphate and baking conditions for electrodeposition coating were different. The metal substrate of each of MUTs 1 to 7 is the steel sheet 2, and the electrodeposition coat 4 has a thickness of 10 μm. The details of the coating conditions A to G shown in Table 1 are shown in Table 2. For MUTs, the corrosion resistance tests were performed in the manner shown in FIG. 1.

TABLE 1

|  |  |  | Comparative Example | | | | | Test |
|---|---|---|---|---|---|---|---|---|
|  |  |  | 1 | 2 | 3 | 4 | Example 1 | Example 1 |
| Temperature (° C.) | | | 23 | 50 | 50 | 70 | 70 | — |
| Water Penetration Enhancer | | | — | — | Kaolinite | Kaolinite | Kaolinite | |
| Holding Time (min) | | | | | — | | 30 | |
| Conduction Time (hr) | | | | 5 | | 0.75 | 0.5 | |
| Rate of Corrosion Progress (mm/hr but mm/day in Text Example 1) | 1 | Coating Conditions A | 0.1 | 0.4 | 1.4 | 9.3 | 16 | 0.44 |
| | 2 | Coating Conditions B | No Progress | 0.3 | 2 | 8.3 | 20 | 0.60 |
| | 3 | Coating Conditions C | No Progress | 0.1 | 1.1 | 5.6 | 12 | 0.30 |
| | 4 | Coating Conditions D | No Progress | 0.2 | 0.94 | 6.0 | 11 | 0.27 |
| | 5 | Coating Conditions E | No Progress | 0.1 | 0.6 | 3.5 | 11.4 | 0.33 |
| | 6 | Coating Conditions F | No Progress | 0.03 | 0.6 | — | — | 0.18 |
| | 7 | Coating Conditions G | No Progress | 0.02 | 0.4 | 1.2 | 4 | 0.10 |
| Correlation with Test Example 1 | $R^2$ | | — | 0.68 | 0.86 | 0.70 | 0.96 | — |
| | Evaluation | | Bad | Acceptable | Good | Acceptable | Good | |
| Comprehensive Evaluation | | | Bad | Bad | Acceptable | Acceptable | Good | |

TABLE 2

| Coating Conditions | Conversion Treatment Time (sec) | Electrodeposition Baking Conditions |
| --- | --- | --- |
| A | 120 | 140° C. × 15 min |
| B | 10 | 140° C. × 20 min |
| C | 30 | |
| D | 120 | |
| E | 10 | 150° C. × 20 min |
| F | 30 | |
| G | 120 | |

The artificial defects 5 having a size of 1 mm and reaching the steel sheet were introduced quantitatively, that is at a load (test force) of 30 kg, to the MUTs at two points at a distance of 4 cm using a Vickers hardness tester.

In the tests of Comparative Examples 1 and 2, a sodium chloride solution obtained by mixing 50 g of sodium chloride as a supporting electrolyte into 1.3 L of water was used as the water-containing material 6. In the tests of Comparative Examples 3 and 4 as well as Example 1, simulated mud obtained by mixing 50 g of sodium chloride as a supporting electrolyte and 500 g of kaolinite as clay minerals into 1.3 L of water was used as the water-containing material 6.

As the electrodes 12, ring-shaped perforated electrodes (made of platinum) with an outer diameter of about 32 mm and an inner diameter of about 30 mm were used. The electrodes 12 are not limited to platinum electrodes and may also be other electrodes such as carbon electrodes.

A hot plate was placed under the steel sheet and rubber heaters were wound around the cylinders to increase and maintain the temperatures of the steel sheet and the water-containing material 6 as shown in Table 1.

Electricity was conducted by the conduction means 8 at a current value of 1 mA for the conduction time shown in Table 1. In Comparative Examples 1 to 4, electricity was conducted immediately after the treatment. In Example 1, the MUTs were held at 70° C. for 30 minutes after the treatment and before the electrical conduction.

After the end of the electrical conduction, the rates of corrosion progress (the rates of swelling of the coats) were measured for the respective MUTs by the method described above in the corrosion resistance evaluation.

Table 1 shows the rates of corrosion progress (the rates of swelling of the coats) obtained by the tests in Example 1 and Comparative Examples 1 to 4. Test Example 1 shows the rates of corrosion progress obtained as a result of actual corrosion tests in which the artificial defects 5 of the MUTs were attached with simulated mud and exposed to an environment at a temperature of 50° C. and a humidity of 98%. FIG. 3 shows the correlation between the rates of corrosion progress in Example 1 and in Test Example 1.

It is found from the correlation shown in Table 1 and FIG. 3 with respect to the MUTs 1 to 5 and 7 of Example 1 that the rates of corrosion progress according to the present corrosion resistance tests and according to the actual corrosion tests are highly correlated ($R^2$=0.96).

On the other hand, it is found from the correlation shown in Table 1 with respect to Comparative Examples 2 and 4 that the rates of corrosion progress according to these comparative examples and according to Test Example 1 are less correlated at $R^2$=0.68 and 0.70, respectively. In Comparative Example 3, although the correlation is relatively high, $R^2$=0.86, it is found that the electrical conduction time lasts long, five hours. With respect to the test of Comparative Example 1, swelling of the coat was observed in none of the MUTs 2 to 7.

As described above, in the method of testing corrosion resistance according to this embodiment, the water-containing material 6 contains the clay minerals, and the holding precedes the electrical conduction. These features promote, in advance, the migration of ions and penetration of water into the electrodeposition coat 4, thereby allowing accurate evaluation of the rate of corrosion progress in a decreased time.

Capability of Water-Containing Material Promoting Water Absorption of Coats

Various deposits were provided on the surfaces of various types of the electrodeposition coats 4 with different thicknesses under different baking conditions to examine the water absorption and swelling rates of the electrodeposition coats 4 after nine days. The following five types and states of the deposits are shown in FIGS. 4 to 6: water, 5% of NaCl (spray), 5% of $CaCl_2$) (spray), simulated mud and 5% of NaCl (immersion). The composition of the "simulated mud" is: water:kaolinite:sodium chloride:sodium sulfate:calcium chloride=500:500:25:25:25 (mass ratio).

According to FIG. 4, each of the water, 5% of NaCl (spray), and 5% of $CaCl_2$) (spray) had slight water absorption and little swelling of the coat even after nine days.

By contrast, according to FIG. 5, the simulated mud had significantly improved water absorption and swelling rate after nine days as compared to the water, 5% of NaCl (spray) and 5% of $CaCl_2$) (spray). In particular, it is clear from the comparison under the same baking conditions 150° C.×20 min of the electrodeposition coat 4 that the simulated mud has remarkably improved water absorption and swelling rate.

According to FIG. 6, 5% of NaCl (immersion) had higher water absorption and swelling rate than the water, 5% of NaCl (spray) and 5% of $CaCl_2$) (spray), but much lower than the simulated mud of FIG. 5.

Figure 7:
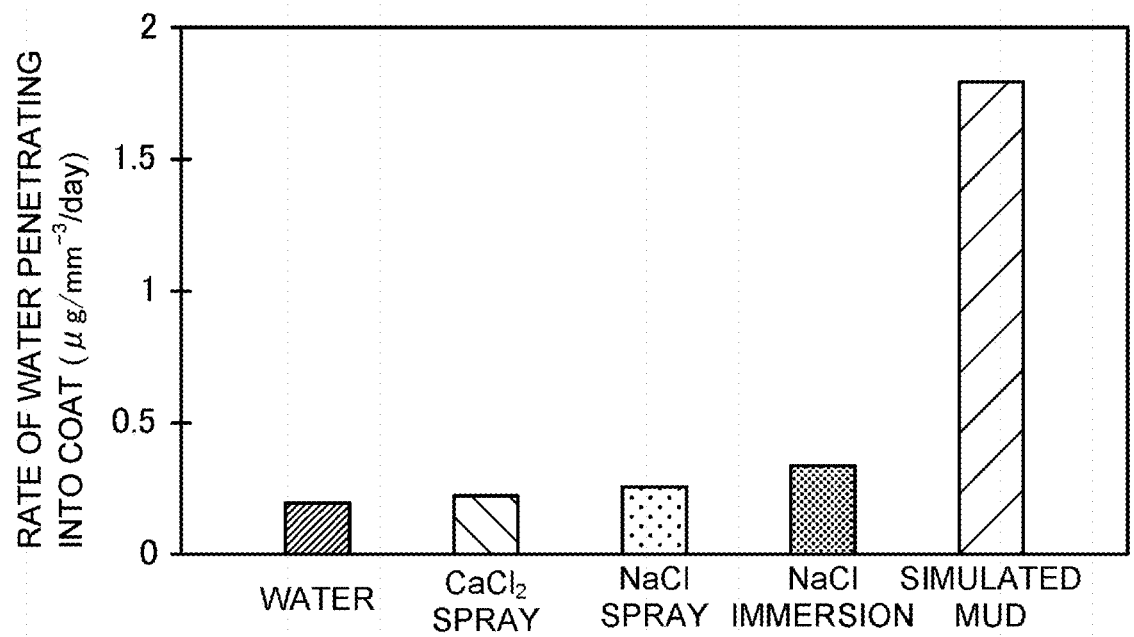
FIG. 7 is a graph illustrating the rates of water penetrating from the respective deposits into the coats.

FIG. 7 illustrates comparison in the rates of water penetrating into the coats among the five types where the electrodeposition coats 4 were baked under the conditions of 150° C.×20 min. The rates of water penetrating into the coats were calculated based on the time until the water absorption of the coats reached 25 μg/mm$^{-3}$. According to the figure, it is found that the simulated mud had largely increased rate of water penetrating into the coats as compared to the salt water spray, for example.

It is found from above that employment of simulated mud containing clay minerals as a water penetration enhancer, as the water-containing material 6, water rapidly penetrates into the coat, which leads to rapid and stable conduction of the corrosion resistance tests according to the electrochemical method described above.

Control of Electrical Conduction

In the corrosion resistance tests according to this embodiment, the electricity is conducted to the metal substrate (steel sheet) 2 not only by the constant-current control method but may be a constant-voltage control method.

Figure 8:
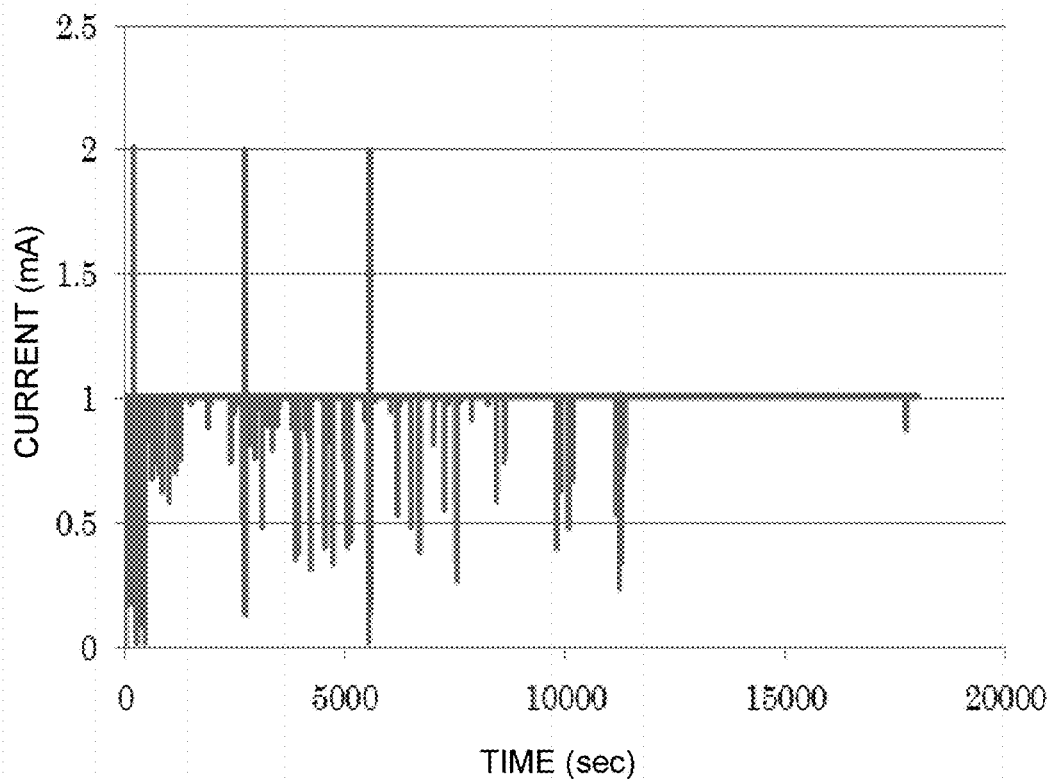
FIG. 8 is a current plot where electrical conduction is controlled at a constant current in the corrosion resistance test according to the first embodiment.
Figure 9:
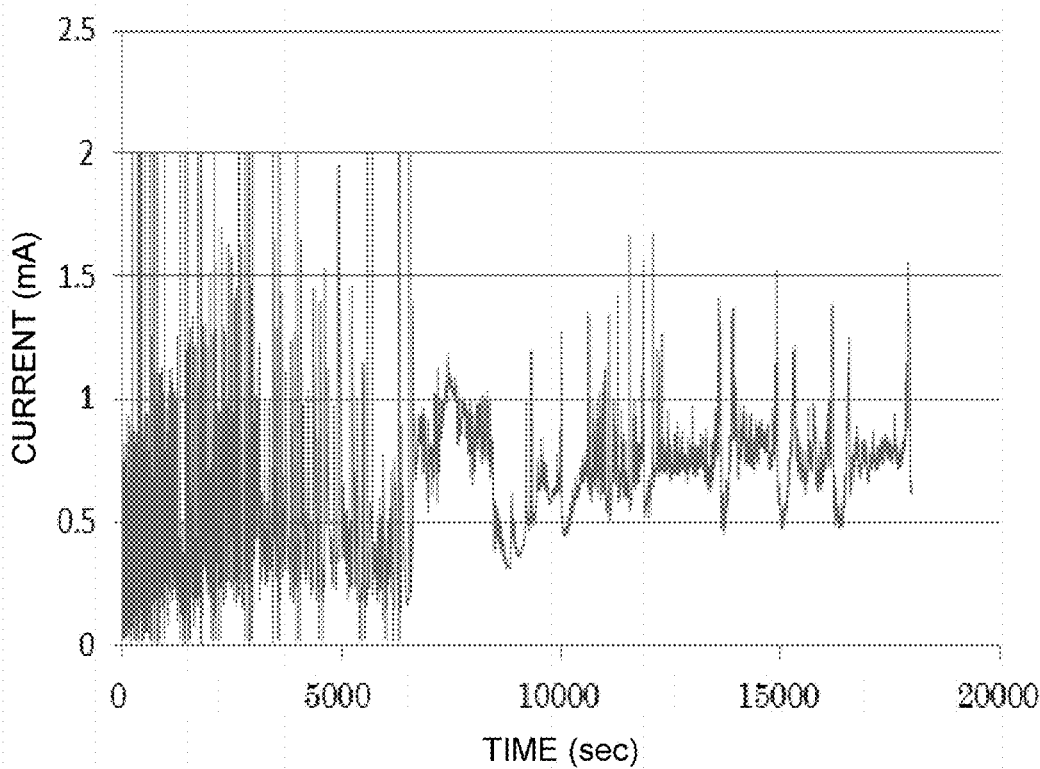
FIG. 9 is a current plot where electrical conduction is controlled at a constant voltage in the corrosion resistance test according to the first embodiment.

FIG. 8 is a current plot of electrical conduction controlled at a constant current of 1 mA (the test of MUT 1 of Comparative Example 3). FIG. 9 is a current plot where a constant voltage is applied at which a current of 1 mA flows. The corrosion resistance tests were conducted by the constant-current control and the constant-voltage control under the same conditions as MUT 1 in Comparative Example 3 except the electrical conduction conditions.

In the constant-current control, the current value varies a little at the initial value but controlled at about 1 mA. In this manner, the current value directly involved in the acceleration of corrosion is stabilized, which improves the reproducibility and acceleration of corrosion. That is, the reliability of the corrosion resistance tests improves.

By contrast, in the constant-voltage control, it is found that the current value varies greatly, which is disadvantageous in reproducibility and acceleration of corrosion. The period in which the current greatly varies from the start of electrical conduction to about 7000 seconds corresponds to the period in which water penetrates into the electrodeposition coat 4. This great variation of the current value may be result from of the water not steadily proceeding to penetrate into the coat 4. After that, the current value still varies within a range from 0.5 mA to 1.5 mA. This may be caused by the influence of the variation in the resistance value due to the deteriorated conversion coating and rusting. The method of testing corrosion resistance according to this embodiment includes the holding before the electrical conduction, and thus reduces the variation in the current value from the start of the electrical conduction to about 7000 seconds. It is considered from the current plot (current waveform) in the constant-voltage control that the state and degree of corrosion in the stage in which the corrosion progresses are easily figured out.

Second Embodiment

Now, another embodiment according to the present disclosure will be described in detail. In the description of the embodiments, the same reference characters as those in the first embodiment are used to represent equivalent elements, and the detailed explanation thereof will be omitted.

While provided on the surface of the coated metal material 1 at two points in the first embodiment, the artificial defects 5 may be omitted. While the electrodes 12 are arranged in the two positions in the first embodiment, an electrode 12 may be disposed in a position.

Figure 10:
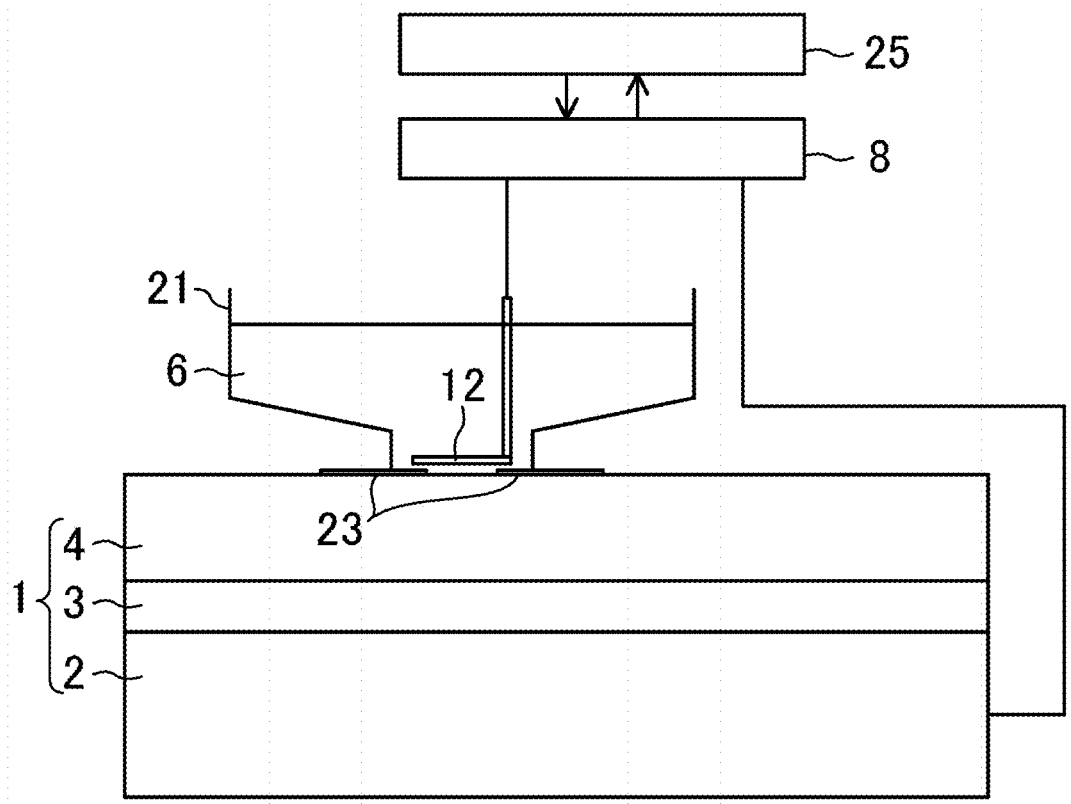
FIG. 10 illustrates a method of testing corrosion resistance according to a second embodiment.

Specifically, as shown in FIG. 10, for example, a corrosion resistance tester includes an electrode 12, a conduction means 8 as a power supply and a current detector, and an information processing terminal 25 as a controller and a determiner. The conduction means 8 is connected to the electrode 12 and the steel sheet 2 of the coated metal material 1. The information processing terminal 25 is communicatively connected to the conduction means 8.

The electrode 12 is for applying a voltage between the steel sheet 2 and the electrodeposition coat 4. As in the first embodiment, the electrode 12 is a ring-shaped perforated electrode buried in a water-containing material 6 that is identical or similar to that in the first embodiment. The electrode 12 is disposed in parallel to the surface of the electrodeposition coat 4 but not in contact with the electrodeposition coat 4. A wire of the conduction means 8 is connected to the steel sheet 2.

The water-containing material 6 is contained in a container 21 on the surface of the electrodeposition coat 4 with a rubber mat 23 for preventing and reducing liquid leakage interposed therebetween. The electrode 12 is slightly spaced apart from the electrodeposition coat 4 with the water-containing material 6 interposed therebetween.

In this manner, the configuration with no artificial defect 5 and the electrode 12 in one position allows more simple corrosion resistance tests.

The contact area (measurement area) between the water-containing material 6 and the electrodeposition coat 4 may preferably range from 19.6 $mm^2$ to 314 $mm^2$, for example. More preferably, the contact area may range from 50.2 $mm^2$ to 113 $mm^2$. Note that the electrode 12 may be in contact with the electrodeposition coat 4.

The conduction means 8 is connected to the electrode 12 and the steel sheet 2. While serving as a power supply for applying a voltage between the surface of the electrodeposition coat 4 and the steel sheet 2, the conduction means 8 also serves as a current detector for detecting a current flowing between the electrodeposition coat 4 and the steel sheet 2. Specifically, for example, a potentiostat/galvanostat that can be controlled as a voltage/current application method may be used.

The information processing terminal 25 serves as a controller for controlling the voltage applied by the conduction means 8. The information processing terminal 25 also serves as a determiner for evaluating the corrosion resistance of the coated metal material 1 based on a value related to the current detected by the conduction means 8. This point will be described in detail in the following method of testing corrosion resistance. The information processing terminal 25 may be, for example, a general-purpose computer.

Other Embodiments

While including the electrodeposition coat 4 as the surface treatment film in the embodiments described above, the coated metal material 1 may include a multilayer film of two or more layers as the surface treatment film. Specifically, for example, the multilayer film may include, in addition to the electrodeposition coat 4, an intermediate coat on the surface of the electrodeposition coat 4 and selectively include a finish coat or the like on the intermediate coat.

The intermediate coat serves to provide reliable finishing and chipping resistance of the coated metal material 1 and to improve the adhesion between the electrodeposition coat 4 and the finish coat. The finish coat provides reliable color, finishing, and weather resistance of the coating metal material 1. Specifically, these coats may be made of, for example, a paint containing a base resin, such as a polyester resin, an acrylic resin, or an alkyd resin; and a crosslinking agent, such as a melamine resin, a urea resin, or a polyisocyanate compound (including a block copolymer).

This configuration allows, in a manufacturing process of an automobile member, for example, taking out of parts from the manufacturing line in each coating step and check of the qualities of the coats.

In the embodiments described above, the water penetration enhancer is made of the clay minerals but not limited thereto, as long as functioning to promote the penetration of water into the electrodeposition coat 4. For example, a solvent, such as acetone, ethanol, toluene, or methanol; or a material improving the wettability of the coat may be used.

While being the perforated electrode(s) with the through hole(s) 12a in the embodiments described above, the electrode(s) 12 may be provided with no through hole(s) 12a. The shape of the electrode(s) is not particularly limited. The electrode(s) may be in a shape generally used for electrochemical measurement.

The present disclosure provides a method of testing corrosion resistance that promotes rapid and uniform migration of ions and penetration of water into a surface treatment film to improve the reliability of the corrosion resistance test and reduce the test time, and is thus significantly useful.

What is claimed is:

1. A method of testing a corrosion resistance of a coated metal material including a coat on a metal substrate, the method comprising:

treatment of interposing a water-containing material containing a supporting electrolyte and a water penetration enhancer between a surface of the coat of the coated metal material and an electrode;

holding of the water-containing material on the surface of the coat for one minute to one day; and conducting electricity from the electrode through the water-containing material to the coated metal material.

2. The method of claim 1, wherein
the coated metal material and/or the water-containing material has/have a temperature ranging from 30° C. to 100° C.

3. The method of claim 1, wherein
the water penetration enhancer is made of clay minerals, and
the water-containing material is mud.

4. The method of claim 3, wherein
the clay minerals are layered silicate minerals or zeolite.

5. The method of claim 4, wherein
the layered silicate minerals are at least one selected from kaolinite, montmorillonite, sericite, illite, glauconite, chlorite, and talc.

6. The method of claim 1, wherein
the supporting electrolyte is at least one kind of salt selected from sodium chloride, sodium sulfate, and calcium chloride.

7. The method of claim 1, further comprising:
introduction of artificial defects into two distant points of the coated metal material, the artificial defects penetrating the coat to reach the metal substrate, wherein in the treatment, the artificial defects at the two points are electrically connected by an external circuit with the water-containing material interposed between the surface of the coat and the electrode, and the electricity is conducted by the external circuit to the metal substrate to promote corrosion of the coated metal material with one of the artificial defects at the two points serving as an anode site and the other as a cathode site.

8. The method of claim 7, wherein
the one of the artificial defects at the cathode site has a size ranging from 0.1 mm to 5 mm.

9. The method of claim 1, wherein
the electricity is conducted by setting a current value within a range from 10 µA to 10 mA.

10. The method of claim 1, wherein
the coat is a resin coat.

11. The method of claim 1, wherein
the electrode is a carbon electrode or a platinum electrode.

* * * * *